(12) United States Patent
Kubo et al.

(10) Patent No.: US 6,713,744 B1
(45) Date of Patent: Mar. 30, 2004

(54) SCANNER HAVING COLD-CATHODE-TUBE LIGHT SOURCE AND METHOD OF CONTROLLING A DRIVE SIGNAL FOR ILLUMINATING A COLD-CATHODE-TUBE LIGHT SOURCE

(75) Inventors: Shinya Kubo, Tokyo (JP); Tetsuichiro Yamamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 304 days.

(21) Appl. No.: 09/695,323

(22) Filed: Oct. 25, 2000

(30) Foreign Application Priority Data

Oct. 28, 1999 (JP) ............................................ 11-307563

(51) Int. Cl.[7] .................................................. G01J 1/32
(52) U.S. Cl. ........................ 250/205; 315/224; 315/307
(58) Field of Search .......................... 250/205, 234–235, 250/238; 358/474–475, 480; 362/2, 6, 16, 18; 315/224, 307, 149, 158

(56) References Cited

U.S. PATENT DOCUMENTS

| | | | | |
|---|---|---|---|---|
| 4,463,284 A | * | 7/1984 | Tamura et al. ............... | 315/158 |
| 5,151,796 A | | 9/1992 | Ito et al. ...................... | 358/461 |
| 5,854,617 A | | 12/1998 | Lee et al. .................... | 345/102 |
| 6,127,785 A | * | 10/2000 | Williams ...................... | 315/224 |
| 6,313,586 B1 | * | 11/2001 | Yamamoto et al. ......... | 315/224 |
| 6,330,083 B1 | * | 12/2001 | Nabeshima et al. ........ | 358/474 |
| 6,531,830 B2 | * | 3/2003 | Akimoto et al. ............ | 315/224 |

FOREIGN PATENT DOCUMENTS

| | | | |
|---|---|---|---|
| DE | 3228020 A1 | 1/1982 | |
| JP | 7-272881 | 10/1995 | |
| JP | 11-067485 | 3/1999 | ................... 315/50 |

OTHER PUBLICATIONS

English translation of German office action dated Mar. 15, 2000.

* cited by examiner

*Primary Examiner*—David Porta
*Assistant Examiner*—Patrick J. Lee
(74) *Attorney, Agent, or Firm*—Whitham, Curtis & Christofferson, PC

(57) ABSTRACT

The scanner includes the switch 10 that is closed when a document is read, the boosted-voltage conversion circuit 12 that boosts a DC voltage of 12 volts (V) supplied from a power source (not shown) and then converts it into a high-frequency signal b of 50 KHz, the temperature detection circuit 20 formed of the thermistor 15 for ambient temperature detection and correction circuit 16, and the dimmer control circuit 13 that varies the high-frequency signal b from the boosted-voltage conversion circuit 12 according to a temperature detected by the thermistor 15 and produces a drive signal c to vary the luminance of the cold-cathode-tube light source 2.

11 Claims, 7 Drawing Sheets

SCANNER HAVING COLD-CATHODE-TUBE LIGHT SOURCE AND METHOD OF CONTROLLING A DRIVE SIGNAL FOR ILLUMINATING A COLD-CATHODE-TUBE LIGHT SOURCE

BACKGROUND OF THE INVENTION

The present invention relates to a scanner that illuminates light onto a document and reads in the reflected light. More particularly, the present invention relates to a scanner that has a cold-cathode-tube light source used as a reading light source and a temperature control circuit for the light source.

Conventionally, some scanners of the type, each which illuminates a document and reads the reflected light, are utilized as scanners for facsimile machines or singly as handy type scanners. Light-emitting diode (LED) light sources or cold-cathode-tube light sources are used as the light source for the scanner. The cold-cathode-tube light source can provide a high luminance (brightness) with low power consumption. This light source is effective for high-speed color scanners.

On the other hand, JP-A No. 67485/1999 discloses a color liquid crystal display as a device including a cold-cathode-tube light source. The cold-cathode-tube light source is used as the back light source for color liquid crystal devices.

Generally, there is the problem in that the cold-cathode-tube light source has the disadvantage in that a change in temperature of the saturated vapor pressure of mercury (Hg) within the cold cathode tube causes a change of luminance. The long use of the liquid crystal display, that is, the long lighting time of the cold cathode tube light source strengthens an influence of a temperature rise due to the self heat dissipation from the cold-cathode-tube light source. For that reason, it is necessary to perform the temperature control by detecting the temperature of the cold-cathode-tube light source as nearly as possible to the cold cathode tube.

In other words, for the cold-cathode-tube light source used as the back light for a liquid crystal display, the scheme of controlling the luminance of the back light according to the temperature of the cold-cathode-tube light source is generally used. In this case, the temperature sensor is disposed near the cold-cathode-tube light source.

However, in the case of a scanner, particularly a small handy-type scanner, it is difficult to dispose the temperature sensor near the cold-cathode-tube light source because of the limited assembly space for the control circuit.

Moreover, in the case of the system of lighting the light source only when the scanner reads a document, the lighting is for a short time of several ten seconds so that the temperature change due to the heat generation of the cold cathode tube itself is small. Hence, in conventional scanners, the temperature rise of the cold-cathode-tube light source is negligible and the temperature control is not performed to the cold-cathode-tube light source.

However, in the case of scanners, when the ambient temperature changes at the lighting start time of the cold-cathode-tube light source (that is, every time of starting a reading operation), the luminance of the cold-cathode-tube light source changes. As a result, the ambient temperature changes the magnitude of an image output signal read out. Particularly, there is the disadvantage in that since a low ambient temperature causes a small magnitude of the image output signal, the S/N ratio of the image output signal is deteriorated, thus degrading the image quality.

In the conventional scanner, a small current is supplied to the cold-cathode-tube light source during non-lighting period to prevent the temperature inside the cold cathode tube from being decreased. However, since the current is continuously flown during non-lighting period, that is, while the document is not being read, the power consumption increases.

SUMMARY OF THE INVENTION

The objective of the present invention is to solve the above-described tasks.

Also, the objective of the present invention is to provide a scanner that can maintain the luminance of the cold cathode tube to a constant level. In order to realize good efficiency in a simplified structure, the scanner controls the tube current by detecting only the ambient temperature under actual scanner use conditions.

According to the present invention, a scanner comprises a cold-cathode-tube light source for illuminating a surface of a document; a photoelectric conversion element for receiving light reflected from the surface of the document and producing an image signal; a temperature detection circuit for detecting an ambient temperature; and a control circuit for controlling a drive signal according to detected temperature information, the drive signal illuminating the cold-cathode-tube light source when the document is read.

According to the present invention, a method of controlling a drive signal for illuminating a cold-cathode-tube light source comprising the steps of: detecting an ambient temperature and controlling a drive signal based on said detected temperature information, said drive signal illuminating said cold-cathode-tube light source when said document is read.

In the drive signal control, the current (tube current), voltage, or frequency of the drive signal is controlled. Moreover, the temperature detection circuit and the control circuit are mounted on the circuit board for the existing document reader. This allows temperature control to be realized by adding a minimum number of components, without adding a complicated control circuit.

According to another aspect of the present invention, a scanner comprises a cold-cathode-tube light source for illuminating a surface of a document; a photoelectric conversion element for receiving light reflected from the surface of the document and producing an image signal; an impedance detection circuit for detecting an impedance between electrodes of the cold-cathode-tube light source; and a control circuit for controlling a drive signal according to detected impedance information, the drive signal illuminating the cold-cathode-tube light source when the document is read.

The impedance between electrodes of the cold-cathode-tube light source changes with ambient temperatures. The luminance can be controlled constant by controlling the drive signal of the cold-cathode-tube light source with the detected impedance.

BRIEF DESCRIPTION OF THE DRAWINGS

This and other objects, features and advantages of the present invention will become more apparent upon a reading of the following detailed description and drawings, in which.

DESCRIPTION OF THE EMBODIMENTS

Figure 1:
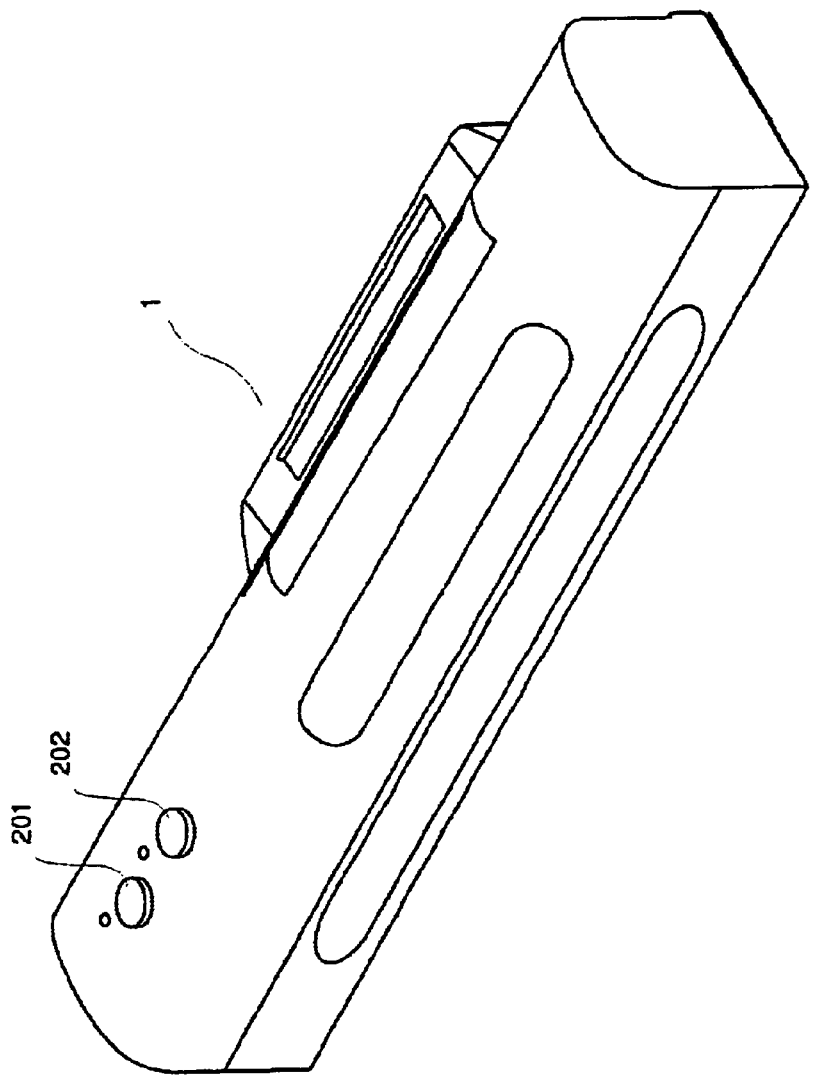
FIG. 1 is a perspective view illustrating the external appearance of a scanner according to an embodiment of the present invention.
Figure 2:
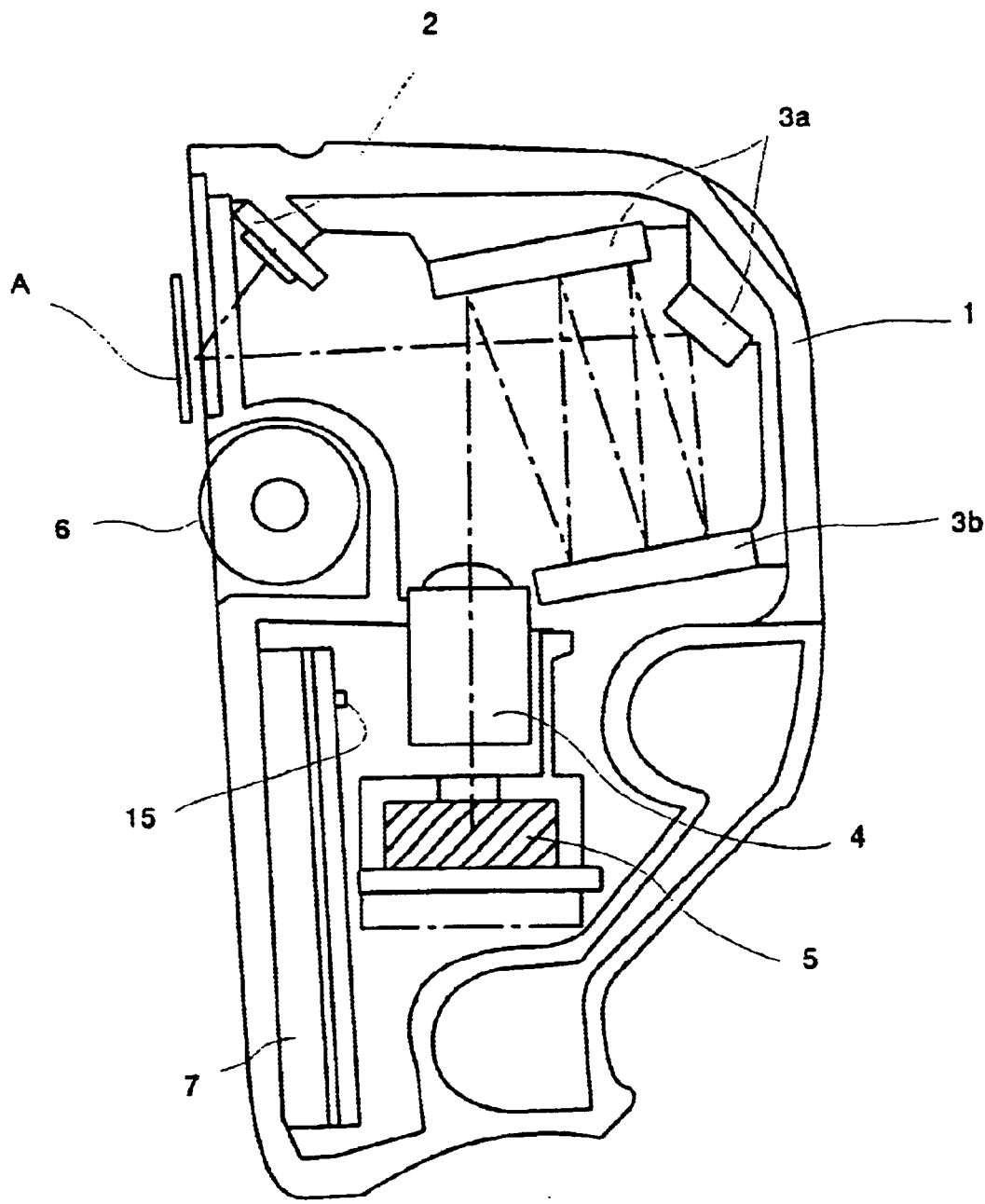
FIG. 2 is a cross-sectional view illustrating the scanner shown in FIG. 1.

Next, an embodiment of the present invention will be explained with reference to the attached drawings. FIG. 1 is a perspective view illustrating a scanner according to an embodiment of the present invention. FIG. 2 is a cross-sectional view illustrating the scanner of FIG. 1.

Referring to FIG. 1, numeral 1 represents a handy-type scanner usable alone. A power on/off switch 201 and a scanner switch 202 are mounted on the outer surface of the scanner 1.

The power on/off switch 201 is a power on/off switch for the scanner 1. The scanner switch 202 is turned on when the scanner 1 performs a reading operation and is turned off when the scanner 1 does not perform a reading operation.

A cold-cathode-tube light source 2, as shown in FIG. 2, is mounted within the scanner 1. The light from the cold-cathode-tube light source 2 is reflected back from the surface A of a document to be read. The reflected light is repeatedly reflected between mirrors 3a and 3b and enters into the photoelectric conversion element 5 via the lens 4. The scanner 1 is provided with a roller 6 for smoothing the movement.

An electrical circuit board 7, on which a temperature control circuit for the cold-cathode-tube light source 2 and a drive circuit for the photoelectric conversion element 5 and a power source circuit, is mounted within the scanner. The thermistor 15, which is a temperature detection element for detecting ambient temperatures, is mounted on the electrical circuit board 7. The thermistor 15 is positioned at any place for detecting ambient temperatures, except places with large heat generation.

Figure 3:
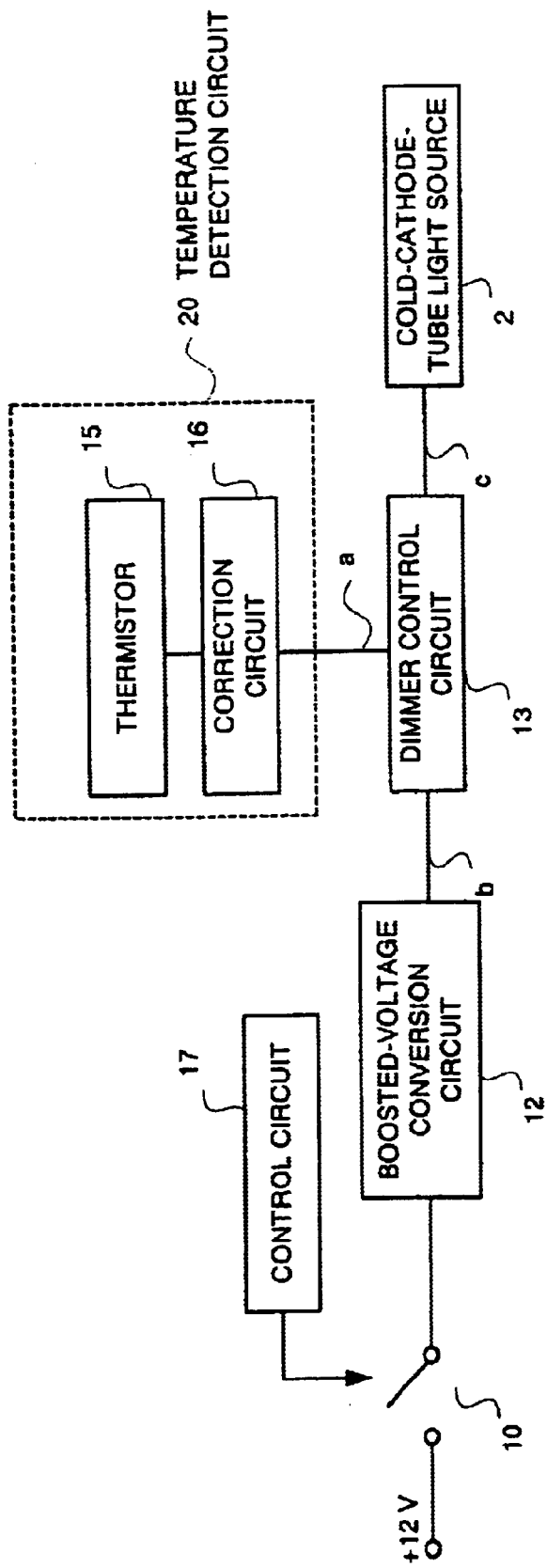
FIG. 3 is a block diagram illustrating the temperature control circuit for a scanner according to an embodiment of the present invention.

FIG. 3 is a block diagram illustrating the temperature control circuit for the cold-cathode-tube light source 2.

Referring to FIG. 3, the temperature control circuit is configured of a switch 10, a boosted-voltage conversion circuit 12, a temperature detection circuit 20, a dimmer control circuit 13, and a control circuit 17. The boosted-voltage conversion circuit 12 boosts a DC voltage of 12 volts (V) from a power source (not shown) and converts it into a high-frequency signal b of 50 KHz. The temperature detection circuit 20 consists of the thermistor 15 for ambient temperature detection and the correction circuit 16. The dimmer control circuit 13 changes the high-frequency signal b from the boosted-voltage circuit 12 according to a temperature detected by the thermistor 15 to produce the drive signal c, thus performing dimmer control to change luminance of the cold-cathode-tube light source 2.

Figure 4:
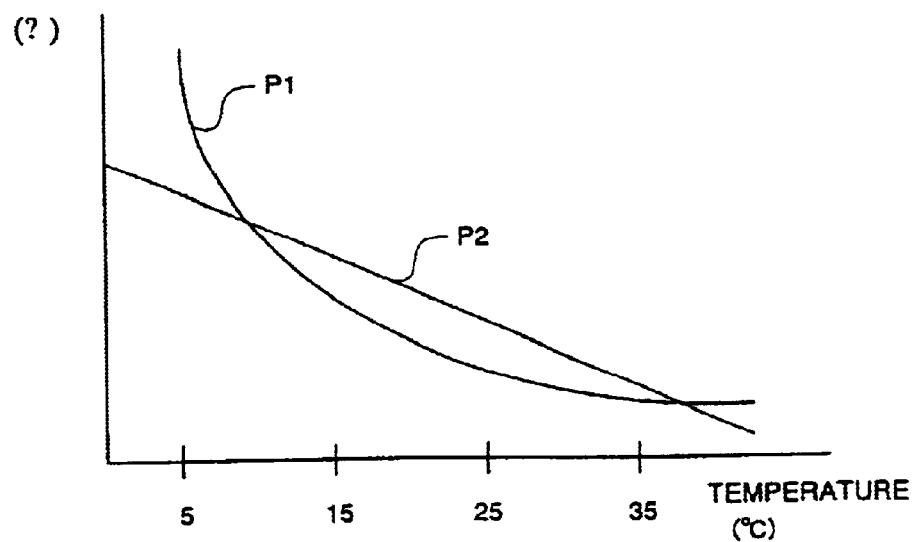
FIG. 4 is a characteristic diagram illustrating the thermistor characteristic of the temperature control circuit shown in FIG. 3 and the corrected characteristic thereof.

The temperature to resistance characteristic P1 of the thermistor 15 detecting an ambient temperature, as shown in FIG. 4, varies nonlinearly. The correction circuit 16 within the temperature detection circuit 20 converts the non-linear characteristic into the linear characteristic P2 and corrects the thermistor output to linearly vary the resistance of the thermistor 15 due to detected temperature changes. That is, the correction circuit 16 can control the light amount controlling operation of the dimmer control circuit 13 proportionally to the ambient temperature.

Figure 5:
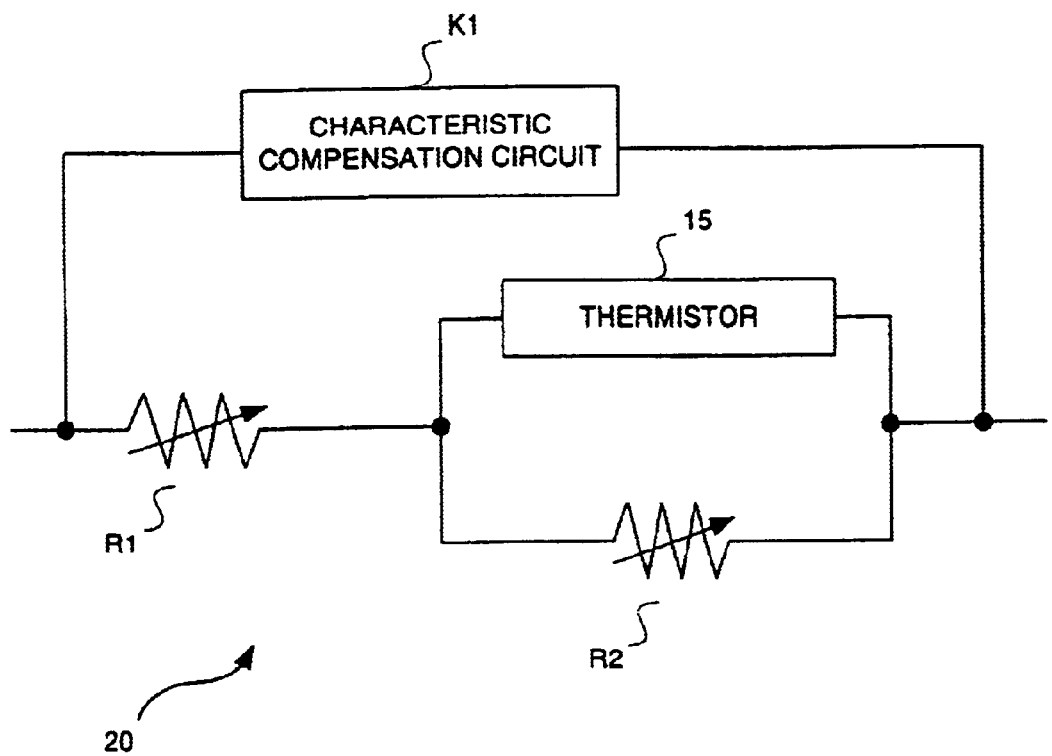
FIG. 5 is a circuit diagram illustrating the temperature detection circuit in the temperature control circuit shown in FIG. 3.

Specifically, the correction circuit 16 in the temperature detection circuit 20, as shown in FIG. 5, is configured of a variable resistor R1, a variable resistor R2 and a characteristic compensation circuit K1. The impedance of the correction circuit of FIG. 5 is varied while the resistance values of the variable resistors R1 and R2 are varied. Thus, the output characteristic of the thermistor 15 is approximated to a desired characteristic (the characteristic P2 in FIG. 4). The output of the correction circuit 16 corresponds to the corrected output voltage a linearly reduced according to an increase in ambient temperature.

In an operation of the scanner 1, the power on/off switch 201 is first turned on. When the document A is read in, the scanner switch 202 is turned on.

When the scan switch 202 is turned on, the control circuit 17, shown in FIG. 3, turns on the switch 10. The switch 10 may be the scan switch 202 itself.

When the switch 10 is turned on, a dc voltage of 12 (V) is supplied to the boosted-voltage conversion circuit 12.

Figure 6:
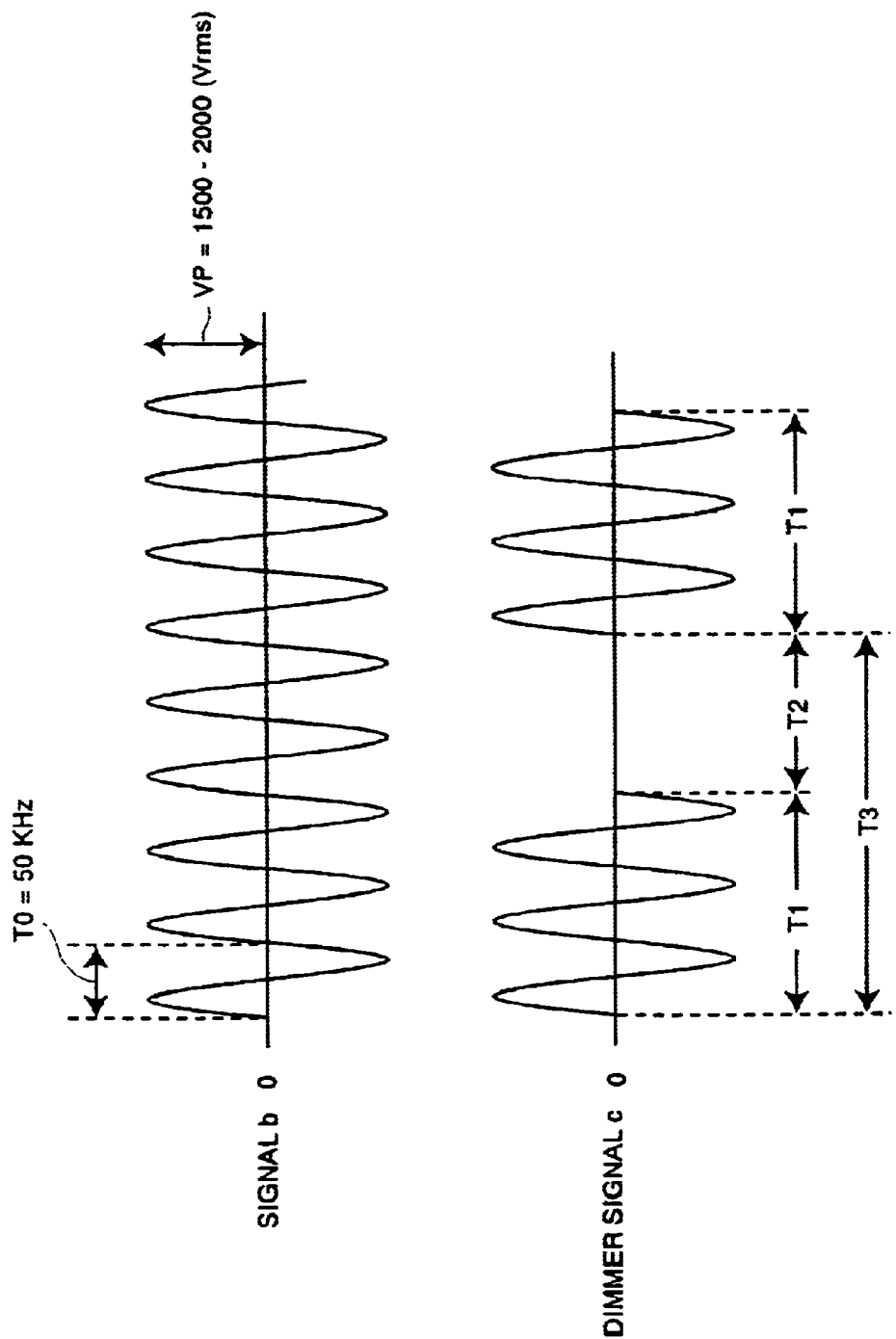
FIG. 6 is a circuit diagram illustrating the operation of the boosted-voltage circuit and the dimmer control circuit in the temperature control circuit shown in FIG. 3

FIG. 6 is a waveform diagram for explaining the operation of the boosted-voltage conversion circuit 12 and the dimmer control circuit 13.

The boosted-voltage conversion circuit 12 boosts the voltage signal of a dc voltage of 12 (V) and produces a high-frequency signal b of which the peak voltage VP is 1500 to 2000 (Vrms) in effective value. The peak voltage VP is sufficient to discharge the cold-cathode-tube light source 2. In this embodiment, the frequency TO of the high-frequency signal b is 50 KHz. However, the frequency TO is not limited to 50 KHz.

The dimmer control circuit 13 varies the high-frequency signal b according to the corrected output voltage a and produces the drive signal c which lights the cold-cathode-tube light source 2 and varies the tube current. The drive signal c is supplied to electrodes (not shown) of the cold-cathode-tube light source 2.

Specifically, the dimmer control circuit 13 controls the light source every period T3 (=T1+T2) as shown in FIG. 6 and varies the ON time T1 of the high-frequency (b) every period T3 and proportionally to the corrected output voltage a. In other words, the dimmer control circuit 12 produces the drive signal c, which intermittently flows the tube current, and controls the effective tube current according to the applied time. As a result, as the temperature detected by the thermistor 15 increases, the ON time T1 of the drive signal c reduces proportionally to the temperature. Thus, the luminance (light amount) of the cold-cathode-tube light source 2 is maintained constant.

The temperature control circuit of FIG. 3 varies the tube current of the cold-cathode-tube light source 2 according to the ambient temperature detected by the thermistor 15 upon reading the document and maintains the luminance to a constant level thereof. In other words, the dimmer control circuit 13 controls the drive signal c applied to the cold-cathode-tube light source 2 and maintains at all times the luminance to a constant level, independently of the ambient temperature. As a result, the brightness of the light illuminated onto the surface of a document 7 from the coldcathode-tube light source 4 is set to a constant level. The magnitude of an image signal for the document A which is read by the photoelectric conversion element 5 via the lens 4 shown in FIG. 1 is set to a constant level. Accordingly, the image quality can be obtained independently of the ambient temperature.

Various methods are considered to the control circuit that produces drive signals for controllably illuminating the cold-cathode-tube light source 2, shown in FIG. 3.

Referring to FIG. 3, the boosted voltage conversion circuit 12 and the dimmer control circuit 13, which generate a lighting voltage, are separated from each other. However, the boosted voltage conversion circuit 12 and the dimmer control circuit 13 may be configured as one control circuit to control the drive signal which illuminates the cold-cathode-tube light source 2 according to the temperature information from the temperature detection circuit 20.

A voltage control circuit may be employed as one example for the control circuit to vary the peak to peak voltage VP of the drive signal c according to the correction output voltage (a). In this case, since the thermistor 15 decreases the voltage of the drive signal c with the increasing ambient temperature, the brightness of the cold-cathode-tube light source 2 is maintained constant.

A voltage/frequency conversion circuit may be employed for the control circuit to vary the frequency of the drive signal c according to the correction output voltage (a). In this case, since the thermistor 15 decreases the frequency of the drive signal c with the increasing ambient temperature, the brightness of the cold-cathode-tube light source 2 is maintained constant.

In the embodiment of the present invention, the temperature detection circuit and the control circuit may be configured of digital circuits. In this case, the control circuit produces drive signals with predetermined waveforms previously stored in the ROM according to the temperature digital information from the temperature detection circuit and boosts the voltage of the drive signal to 1500 to 2000 (Vrms) to drive the cold-cathode-tube light source 2.

As described above, in the embodiment of the present invention, the tube current value is controlled while the ambient temperature is being observed, so that the luminance upon scanning is controlled to a constant level.

That control enables the tube current value to be uniquely determined upon scanning according to ambient temperatures. Thus, a constant luminance can be obtained at all times over the range (5 to 35° C.) of ambient temperatures where systems such as scanners or facsimile machines are used. Thus, an image quality at a constant level can be obtained independently of the ambient temperature.

Figure 7:
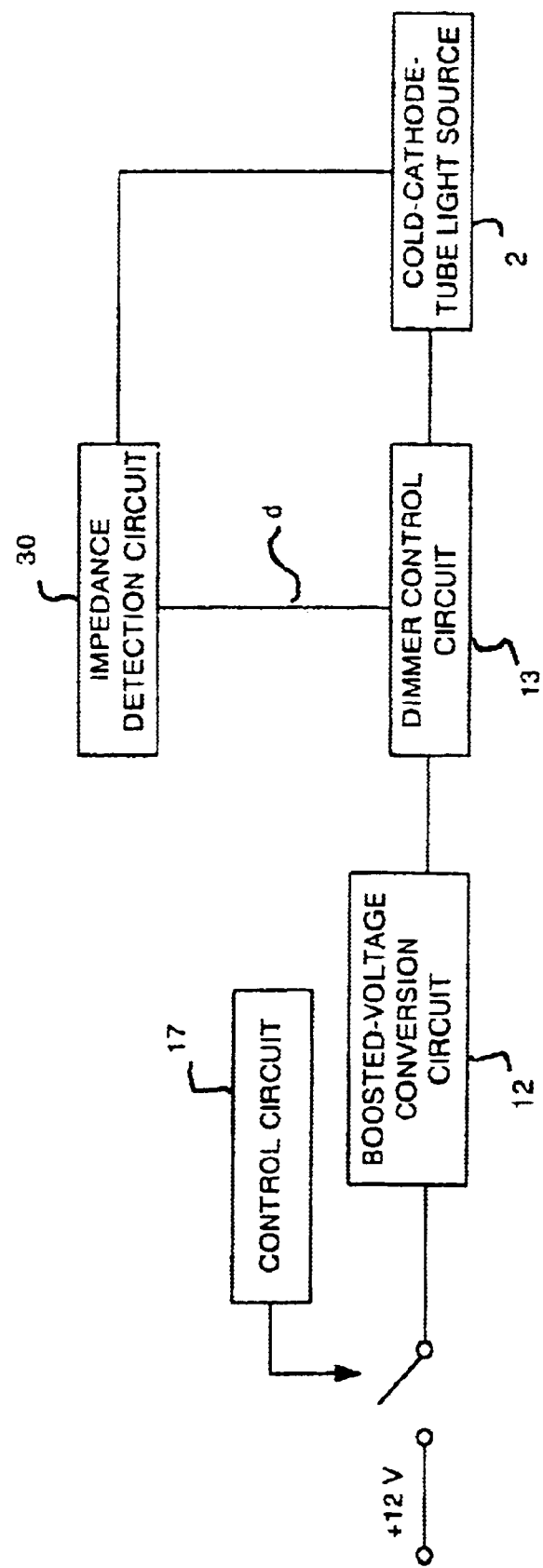
FIG. 7 is a block diagram illustrating the temperature control circuit according to another embodiment of the present invention.

FIG. 7 is a block diagram illustrating another embodiment of the present invention. According to this embodiment, the impedance detection circuit 30 that detects net variations in impedance of the cold cathode tube of the cold-cathode-tube light source 2 is replaced for the temperature detection circuit 20 of FIG. 3.

The impedance detection circuit 30 detects the impedance of the cold-cathode-tube light source 2, which varies according to ambient temperatures, and then produces the voltage signal d varying according to the impedance value.

The dimmer control circuit 13 controls the drive signal supplied to the cathode-tube light source 2 according to the voltage signal d. The drive signal controls the tube current, voltage, or frequency, as described in the previous embodiment.

Such a configuration can maintain the luminance of the cold-cathode-tube light source to a constant level, independently of ambient temperatures.

As described above, a sole scanner or scanners for facsimile machines, using a cold cathode tube acting as a light source, embodying the present invention, can maintain the luminance of the cold-cathode-tube light source to a constant level, independently of ambient temperatures.

Maintaining the luminance constant, independent of the ambient temperature, allows the peak follower circuit arranged in the prior art image processing circuit to be eliminated so that the cost reduction of the whole system can be realized. Moreover, the resultant effect is that the S/N ratio of an image signal becomes constant independently of the ambient temperature and that deterioration in image quality is small.

According to the present invention, the temperature detection element that detects only the ambient temperature, not being the temperature of the cold-cathode-tube light source, can be provided at any places, except places with large heat dissipation within the system. This feature enables the freedom in circuit design to be increased. The temperature detection element can be realized by adding to a minimum number of components to the circuit configuration of the prior-art document reader.

What is claimed is:

1. A sensor comprising:
 a cold-cathode-tube light source for illuminating a surface of a document;
 a photoelectric conversion element for receiving light reflected from the surface of said document and producing an image signal;
 a temperature detection circuit for detecting an ambient temperature at a location remote to the cold-cathode-tube light source; and
 a control circuit for controlling a drive signal according to detected ambient temperature, said drive signal causing said cold-cathode-tube light source to illuminate when said document is read.

2. The scanner defined in claim 1, wherein said control circuit controls the current of said drive signal applied on electrodes of said cold-cathode-tube light source based on said temperature information upon reading said document.

3. The scanner defined in claim 1, wherein said control circuit controls the voltage of said drive signal applied on electrodes of said cold-cathode-tube light source based on said temperature information upon reading said document.

4. The scanner defined in claim 1, wherein said control circuit controls an applied time of said drive signal applied on electrodes of said cold-cathode-tube light source based on said temperature information upon reading said document.

5. The scanner defined in claim 1, wherein said control circuit controls the frequency of said drive signal applied on electrodes of said cold-cathode-tube light source based on said temperature information upon reading said document.

6. A scanner comprising:
 a cold-cathode-tube light source for illuminating a surface of a document;
 a photoelectric conversion element for receiving light reflected from the surface of said document and producing an image signal;
 an impedance detection circuit for detecting an impedance between electrodes of said cold-cathode-tube light source; and a control circuit for controlling a drive signal according to detected impedance information, said drive signal causing said cold-cathode-tube light source to illuminate when said document is read.

7. A method of controlling a drive signal for causing a cold-cathode-tube light source to illuminate comprising the steps:

detecting an ambient temperature at a location away from the cold-cathode-tube light source and controlling a drive signal based on said detected ambient temperature, said drive signal causing said cold-cathode-tube light source to illuminate when said document is read.

8. The method of controlling a drive signal for illuminating a cold-cathode-tube light source defined in claim 7, wherein said step of controls the current of said drive signal applied on electrodes of said cold-cathode-tube light source based on said temperature information upon reading said document.

9. The method of controlling a drive signal for illuminating a cold-cathode-tube light source defined in claim 7, wherein said step of controls the voltage of said drive signal applied on electrodes of said cold-cathode-tube light source based on said temperature information upon reading said document.

10. The method of controlling a drive signal for illuminating a cold-cathode-tube light source defined in claim 7, wherein said step of controls an applied time of said drive signal applied on electrodes of said cold-cathode-tube light source based on said temperature information upon reading said document.

11. The method of controlling a drive signal for illuminating a cold-cathode-tube light source defined in claim 7, wherein said step of controls the frequency of said drive signal applied on electrodes of said cold-cathode-tube light source based on said temperature information upon reading said document.

* * * * *